Patented Nov. 2, 1948

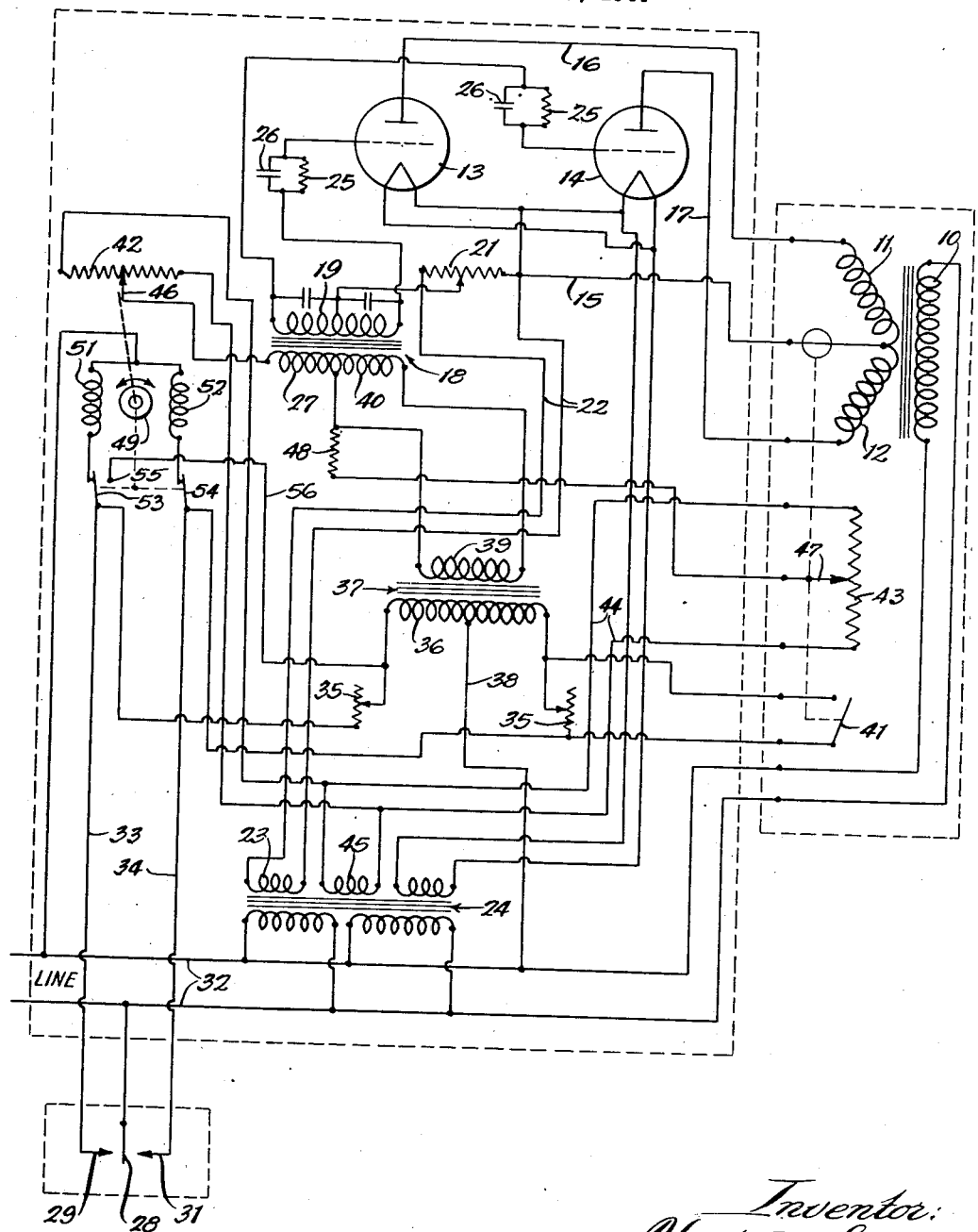

2,452,769

UNITED STATES PATENT OFFICE 2,452,769

ELECTRIC MOTOR CONTROL SYSTEM

Karl A. Lang, Glenview, Ill., assignor to Lindberg Engineering Company, Chicago, Ill., a corporation of Illinois Application February 19, 1944, Serial No. 523,036

9 Claims. (Cl. 318—28)

1

This invention relates to electric control system and more particularly to a system for controlling a physical condition such, for example, as the temperature of a heating furnace.

One of the objects of the invention is to provide an electric control system in which control is effected by a shaded pole motor having its shaded poles selectively shorted.

Another object of the invention is to provide an electric control system in which the shaded poles of a motor are selectively shorted through gaseous discharge tubes controlled in response to the condition.

Still another object of the invention is to provide an electric control system in which a rapid adjustment is made initially upon departure of the condition from a desired value followed by a relatively slow correcting adjustment. In this way, the condition is quickly brought to the desired value without hunting.

A further object of the invention is to provide an electric control system in which automatic control may be manually over-ruled.

A still further object of the invention is to provide an electric control system including safety means to prevent damage to the system or the apparatus controlled thereby.

The above and other objects and advantages of the invention will be more readily apparent from the following description when read in connection with the accompanying drawing, in which the single figure is a wiring diagram of an electric control system embodying the invention.

The system as shown is particularly adapted to control the temperature in a furnace which may be heated electrically or by fluid fuel. The system comprises a shaded pole motor having a main winding 10 and a pair of shaded pole windings 11 and 12. The motor may be connected to a rheostat or the like for controlling an electrically heated furnace or to a valve regulating the fuel supply to a combustion heated furnace.

The shaded poles 11 and 12 of the motor are adapted to be selectively shorted through gaseous discharge tubes 13 and 14, each having a cathode, a plate and a control grid. While tubes of this character are completely satisfactory, it will be understood that other types of tubes or electrical valves could be used if desired. The cathode circuit of the tubes is connected through a wire 15 to the common point of the windings 11 and 12 and the outer ends of the windings are connected through wires 16 and 17 to the plates of the tubes 13 and 14, respectively.

The tubes are controlled through a transformer

2

18 having a center tapped secondary winding 19 whose center tap is connected through a variable resistor 21 to the cathodes of the tubes. A biasing voltage may be supplied through wires 22 connected to the opposite ends of the resistor 21 and to a secondary winding 23 on a power transformer 24. The grids of the tubes 13 and 14 are connected respectively to the opposite ends of the winding 19 through resistors 25 and condensers 26 connected in parallel which insure a sharp cut off for the tubes.

Flow of current through the primary winding 27 of the transformer 18, is controlled in response to the temperature of the furnace. For this purpose a switching mechanism which may be the switches of a conventional pyrometer is provided having a center contact 28 and low and high contacts 29 and 31. The center contact is connected to one side of a power supply 32 which also energizes the main winding 10 of the motor and the low and high contacts 29 and 31 are connected through wires 33 and 34 and through variable resistors 35 to the opposite ends of a primary winding 36 of a transformer 37. The winding 36 is center tapped and has its center tap connected through a wire 38 to the other side of the power supply.

The secondary winding 39 of the transformer 37 is connected to a second primary winding 40 of the transformer 18. If desired, the windings 27 and 40 may have a common lead as shown. With this construction, when the contact 28 engages one of the contacts 29 or 31, the primary winding 36 of the transformer 37 will be energized to impress a voltage on the grids of tubes 13 and 14 through the transformer 18. It will be noted that the phase position of this impressed voltages relative to the voltage generated in the windings 11 and 12 of the shaded pole motor will vary depending upon which of the contacts is closed. Thus, when the contact 29 is closed, the grid in one of the tubes 13 or 14 will be driven positive when the plate of the same tube is positive so that the tube will discharge. However, in the other part of the cycle when the grid of the other tube is driven positive, its plate will be negative so that no discharge will occur. Therefore, closing of one of the switches shorts only one of the windings 11 or 12 and determines the direction of rotation of the shaded pole motor so that it will adjust the rheostat or valve in the proper direction to correct the condition. It will be understood that when the condition such as the furnace temperature is at the desired value, the contact 28 will be in its neutral position and no current will flow through the transformer primary 36. The variable resistors 35 may be adjusted to vary the output of transformer 37 thereby to adjust the position to which the shaded pole motor will move the valve or rheostat.

In order to prevent a dangerous condition which might result in damage to the furnace, a limit switch 41 is provided adapted to be controlled by the shaded pole motor to close when the motor reaches a predetermined position of closing of the fuel valve to prevent backfire. If the contact 31 is closed, tending to run the motor in a direction to decrease the supply of heat to the furnace, the switch 41 will be closed, thereby shunting out the resistance 35 and causing the motor to close the fuel valve completely.

A relatively slower adjustment of the shaded pole motor is adapted to be produced to bring the system into balance without hunting. For this purpose a bridge circuit is provided including a pair of adjustable resistors 42 and 43 having their ends interconnected by wires 44 which are connected to a power supply winding 45 on the transformer 24. Wipers 46 and 47 are movable over the resistors 42 and 43 respectively and are connected through the primary winding 27 of the transformer 18 and through a resistor 48. It will be noted that the primary winding 27 of the transformer 18 is divided by the center tap into one portion controlled by the bridge circuit and a second portion supplied with current by the transformer 37. The net effect of the transformer 18 is therefore the sum of the two currents supplied to the primary windings 27 and 40.

The wiper 47 on resistor 43 is connected to the shaded pole motor to be moved thereby and the wiper 46 is controlled by a reversible motor 49 having windings 51 and 52 connected respectively through switch contacts 53 and 54 to the contacts 29 and 31. The switch contacts 53 and 54 normally occupy the position shown in which they connect the windings 51 and 52 to the contacts 29 and 31 and are connected to the motor 49 to be moved thereby in predetermined positions of the motor.

For maximum input control a contact 55 is provided adapted to be engaged by the switch blade 53 and connected through a wire 56 to one end of the transformer primary winding 36. When the switch blade 53 is moved to the right, it will engage the contact 55. If, at this time, the temperature in the furnace is below the desired value so that the contact 29 will be closed, current will flow through the wire 56 to the primary winding 36 shunting the resistance 35 so that the shaded pole motor will operate rapidly in a direction to increase the supply of heat to the furnace. The switch blade 53 is moved to the right as described by the motor 49 when it reaches a position to rebalance the bridge circuit with wiper 47 in a position corresponding to a predetermined valve opening. It will be understood that this switch can be set to operate at any desired value.

In operation of the system with the furnace temperature at the desired value, the pyrometer contact 28 will occupy a neutral position as shown. At this time, neither of the tubes 13 or 14 is conducting and the motor will not run. Also there will be no current flow through either of the motor windings 51 or 52, or the transformer primary winding 36, and the bridge circuit will be in balance.

In the event the furnace temperature falls below the desired value, the blade 28 will engage the contact 29 simultaneously completing a circuit through the motor winding 51 and through the transformer primary 36. The transformer 37 will immediately cause a flow of current through the transformer primary winding 40 and will cause one of the tubes 13 or 14 to conduct to run the shaded pole motor in a direction to supply more heat to the furnace. The shaded pole motor will shift the position of contact 47 rapidly on rheostat 43 in a direction to unbalance the bridge circuit and produce a counter voltage in the primary winding 27 equal and opposite to the voltage in winding 40. At the same time the operation of the motor 49 will move the contact 46 at a slower rate in a direction tending to rebalance the bridge circuit and will reduce the bucking voltage in the transformer primary 27. The voltage in the winding 40 will then cause one of the tubes to fire to again operate the shaded pole motor in the same direction as before. This operation will be repeated as long as one of the pyrometer contacts is closed, adjusting the shaded pole motor in a series of small steps after the initial operation. Thus the supply of heat to the furnace is adjusted first rapidly and then slowly to bring the furnace quickly to the desired temperature without hunting or over-shooting.

While one embodiment of the invention has been shown and described herein in detail, it will be understood that it is for the purpose of illustration only and is not to be taken as a definition of the scope of the invention, reference being had for that purpose to the appended claims.

What is claimed is:

1. An electric control system comprising a reversible electric motor having a main winding and a pair of shaded pole windings, a bridge circuit having a pair of adjustable resistors, the motor being connected to one of the resistors to adjust it, a second reversible motor for adjusting the other resistor, means responsive to a condition to be controlled to control the operation of the second motor, a pair of gaseous discharge tubes connected to the shaded pole windings respectively, a transformer having a primary winding connected across the bridge circuit and a center tapped secondary winding, the ends of the secondary winding being connected to the grids of the tubes respectively and the center tap being connected to the tube cathodes.

2. An electric control system comprising a reversible motor having a main winding and a pair of shaded pole windings, a pair of gaseous discharge tubes connected to the shaded pole windings respectively, a transformer having its secondary connected to the grids of the tubes, and means responsive to a condition to be controlled to control current flow through the primary of the transformer thereby to control the discharge of the tubes.

3. An electric control system comprising a reversible motor having a main winding and a pair of shaded pole windings, a pair of gaseous discharge tubes connected to the shaded pole windings respectively, a transformer having its secondary connected to the grids of the tubes, the transformer having a center tapped primary winding with its center tap connected to one side of a power source, and switch means responsive to a condition to be controlled selectively to connect the ends of the primary winding to the other side of the power source.

4. An electric control system comprising a reversible motor having a main winding and a pair of shaded pole windings, a pair of gaseous discharge tubes connected to the shaded pole windings respectively, a first transformer having a center tapped secondary with the center tap connected to the cathodes of the tubes and the ends connected to the grids of the tubes respectively, a bridge circuit having a pair of adjustable resistors, the motor being connected to one of the resistors to adjust it, a second reversible motor connected to the other resistor to adjust it, the primary winding of the transformer being connected across the bridge circuit, a second transformer having its secondary connected to the primary of the first named transformer and having a center tapped primary, the center tap of the primary being connected to one side of a source of power, and switch means responsive to a condition to be controlled to connect the ends of the center tapped primary to the other side of the source of power and to control the second motor.

5. An electric control system comprising a reversible motor, a pair of electronic discharge tubes connected to the motor to control its direction of rotation, a transformer having its secondary connected to the tubes to control them and having a pair of primary windings, means responsive to a condition to be controlled to control the direction of current flow through one of the primary windings, a bridge circuit controlling the current flow through the other primary winding, means controlled by the motor to unbalance the bridge circuit, and means responsive to the condition to rebalance the bridge circuit.

6. An electric control system comprising a reversible motor, a pair of electronic discharge tubes connected to the motor to control its direction of rotation, a transformer having its secondary connected to the tubes to control them and having a pair of primary windings, means responsive to a condition to be controlled to control the direction of current flow through one of the primary windings, a variable resistance to control the amount of current flow through said one of the primary windings, a bridge circuit controlling the current flow through the other primary winding, means controlled by the motor to unbalance the bridge circuit, means responsive to said condition to rebalance the bridge circuit, and means controlled by the last named means to shunt the variable resistance when the last named means is in a predetermined position to supply maximum current to said one of the primary windings.

7. An electric control system comprising a reversible motor adapted to be connected to a power source, a transformer having a secondary winding and a pair of primary windings, a pair of switches closed in response to different values of a condition to be controlled, means controlled by the switches to cause a current flow through one of the primary windings of one phase relation to the power source when one switch is closed and of another phase relation when the other switch is closed, a bridge circuit having two adjustable elements and connected to the other primary winding, one of the elements being controlled by the motor, a second reversible motor controlled by the switches controlling the other element to rebalance the bridge circuit, and means controlled by current induced in the transformer secondary in accordance with the phase thereof to control the direction of the first named motor.

8. An electric control system comprising a reversible motor, a pair of switches closed in response to different values of a condition to be controlled, an electrical unit, means controlled by the switches respectively to produce voltages in opposite directions in the electrical unit, a bridge circuit including a pair of movable wipers and connected to the electrical unit to produce a voltage therein opposing the first named voltages when the bridge circuit is unbalanced, means connecting one of the wipers to the motor, a second reversible motor connected to the other wiper, the switches controlling the second reversible motor, and means responsive to the net voltage in the electrical unit to control the first named motor.

9. An electric control system comprising a reversible motor, a pair of switches closed in response to different values of a condition to be controlled, an electrical unit, means controlled by the switches respectively to produce voltages in opposite directions in the electrical unit, a bridge circuit including a pair of movable wipers and connected to the electrical unit to produce a voltage therein opposing the first named voltages when the bridge circuit is unbalanced, means connecting one of the wipers to the motor, a second reversible motor connected to the other wiper, the switches controlling the second reversible motor, a pair of electron discharge tubes connected to the first named motor to control it, and means responsive to the net voltage in the electrical unit to control the tubes.

KARL A. LANG.

REFERENCES CITED

The following references are of record in the file of this patent:

UNITED STATES PATENTS

| Number | Name | Date |
| --- | --- | --- |
| 2,109,776 | Johnson | Mar. 1, 1938 |
| 2,276,816 | Bagno | Mar. 17, 1942 |
| 2,285,287 | Krogh | June 2, 1942 |
| 2,312,711 | Harrison | Mar. 2, 1943 |